United States Patent [19]

Schmoelzer

[11] Patent Number: 4,648,489
[45] Date of Patent: Mar. 10, 1987

[54] BRAKING PRESSURE CONTROL UNIT

[75] Inventor: Ernst Schmoelzer, Frankfurt am Main, Fed. Rep. of Germany

[73] Assignee: Alfred Teves GmbH, Frankfurt am Main, Fed. Rep. of Germany

[21] Appl. No.: 747,004

[22] Filed: Jun. 19, 1985

[30] Foreign Application Priority Data

Jun. 19, 1984 [DE] Fed. Rep. of Germany ....... 3422621

[51] Int. Cl.[4] .......................... B60T 8/18; B60T 8/26
[52] U.S. Cl. .................................. 188/195; 303/22 R
[58] Field of Search ................. 303/22 R, 22 A, 6 C, 303/6 R; 188/195, 349

[56] References Cited

U.S. PATENT DOCUMENTS 4,060,283 11/1977 Demido et al. ................. 188/195 X
4,332,423 6/1982 Schopper et al. .............. 188/195 X

FOREIGN PATENT DOCUMENTS 3004964 8/1981 Fed. Rep. of Germany ...... 188/195

Primary Examiner—Douglas C. Butler

Attorney, Agent, or Firm—James B. Raden; William J. Michals

[57] ABSTRACT

A braking pressure control unit is actuatable in a load-responsive manner by way of an actuating device (10), a spring device (6), and a transmission lever (3) supported at the housing (1) of the braking pressure control unit. The actuating device (10) comprises a first actuating element (11) fastened at a part of the vehicle which is movable in a load-responsive manner relative to the housing (1), of a second actuating element (9), and of a spring (18) arranged between the two elements. Assembly at the vehicle is effected with the spring device (6) being blocked. By the use of the spring (18) supporting itself at the vehicle by way of the first actuating element (11), the transmission lever (3), by way of the second actuating element (9), is pressed into the position which it adopts when the control valves of the braking pressure control unit are in a defined open position. In this position the actuating elements (9) and (11) are connected so as to form a structural unit of defined length so that the transmission lever (3) is connected without play with the vehicle part movable in a load-responsive manner.

2 Claims, 3 Drawing Figures

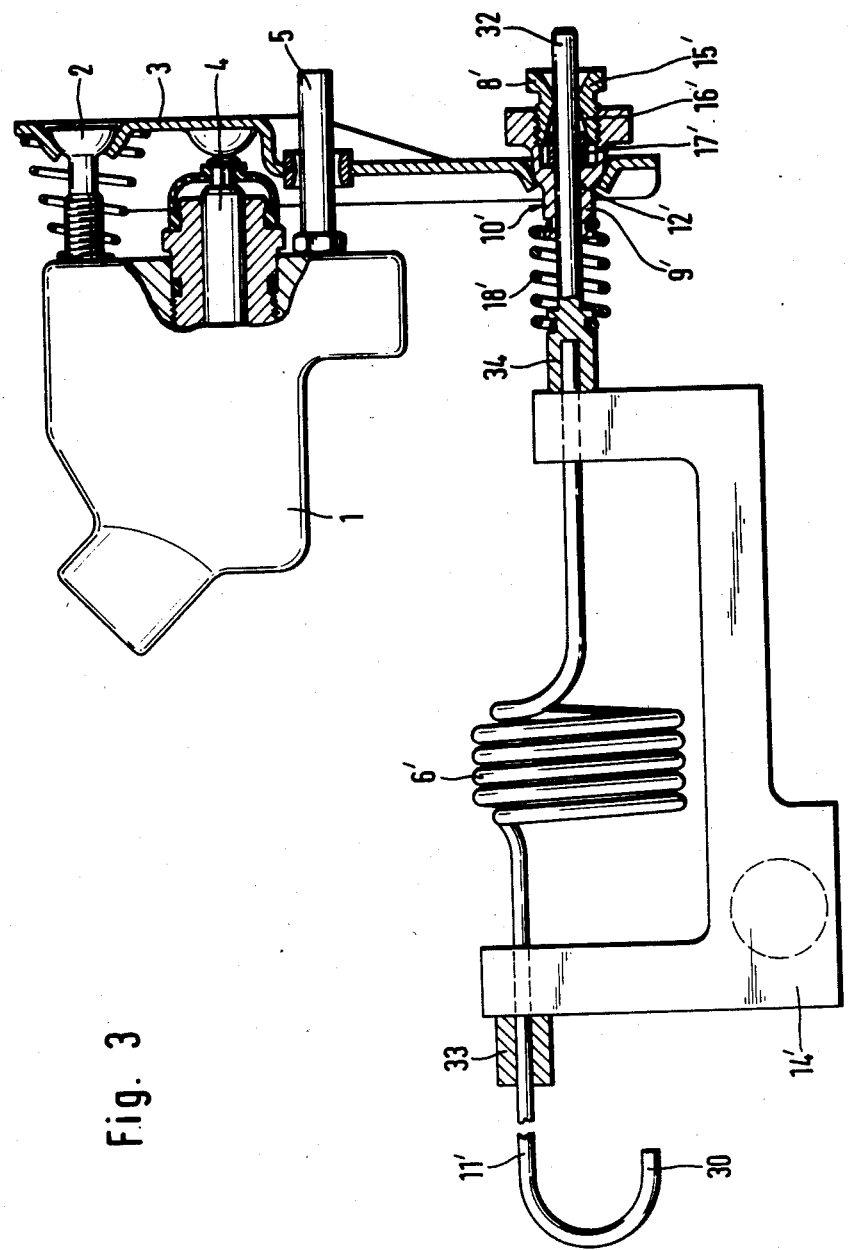

BRAKING PRESSURE CONTROL UNIT

BACKGROUND OF THE INVENTION

This invention relates to a braking pressure control unit for a pressure-medium-operable vehicular brake system. The unit is actuatable in a load-responsive manner by way of a spring device which may be temporarily blocked and which may be hinged to a vehicle part carrying out relative movements with respect to the braking pressure control unit. The unit includes at least one valve with a control piston displaceable in a pressure-dependent manner in the closing direction against the force of the spring device hinged to a swivelling transmission lever. The unit includes an actuating device by means of which the force of the spring device by means of which the force of the spring device is variable and which comprises a first actuating element connectible with the vehicle part, a second actuating element associated with the transmission lever, and a spring arranged between the elements.

In European Pat. (EP) No. 00 29 398 B1 a braking pressure control unit of the type referred to above is disclosed which essentially comprises a first actuating element connectible with an unsprung part of the vehicle, and a second actuating element which is connected by way of the spring device designed as a tension spring with the transmission lever supported at the housing. An auxiliary spring is arranged between the first and second actuating elements. When assembling the braking pressure control unit, with the spring device being blocked, the housing is fastened at a spring-mounted part and the first actuating element is fastened at an unsprung part of the vehicle. During assembly a removable stop ring is arranged at the first actuating element. The length of the second actuating element is varied until the end of the second actuating element rests at the stop ring of the first actuating element, the transmission lever being in the position associated with the valve's open position. Then, both the blocking of the spring device is cancelled and the stop ring is removed from the first actuating element. The second actuating element displaces itself against the force of the auxiliary spring lying on the inside, as the control force of the spring device diminishes, until a balance has been achieved between the two forces of the springs. If there is a change of the position of the unsprung vehicle part relative to the housing of the braking pressure control unit a new balance will result between the springs. Thus two spring elements participate in the generation of the control force transmitted by the transmission lever to the valve device of the braking pressure control unit. This may result in a reduced accuracy of actuation.

It is thus an object of this invention to provide a braking pressure control unit of the type referred to where the auxiliary spring arranged between the actuating elements does not exert any influence on the control force.

SUMMARY OF THE INVENTION

According to this invention this object is achieved in that, with the spring device being blocked, the first and second actuating elements are connectible by means of a connecting device so as to form a structural unit of defined length. If the housing of the braking pressure control unit and the first actuating element are fastened at the associated vehicle parts the transmission lever, with the spring device being blocked, will adopt the position corresponding to a defined open position of the valve. In such an action, by way of the second actuating element, the transmission lever is urged into this position by the spring supporting itself at the vehicle by way of the first actuating element. By means of the subsequent connection of the two actuating elements so as to form a structural unit of defined length the action of the spring on the actuation of the braking pressure control unit is advantageously eliminated and an actuation is ensured which will be free from play. Misadjustment of the actuating device due to a faulty position of the transmission lever is excluded.

It is further provided that the rod-like end of one of the actuating elements is displaceable in a hollow bore of the other actuating element, and that at the other element the connecting device is provided which has a screwed insert having a cone-shaped surface by way of which a ring supporting itself at the end face at the other element may be pressed against or rather into one of the actuating elements. In the simplest way, thus, a continuous adjustment of the defined length of the structural unit of the two actuating elements is realized, an actuation without play being ensured.

A particularly simple embodiment of the actuating device is achieved in that the spring designed as a compression spring is arranged in the hollow bore and in that, at the end of the second actuating element, which is provided with the hollow bore, a collar is formed fast whereat one end of the spring device designed as a compression spring is supported, the other end of the spring device being supported at the transmission lever, and in that the other end of the second actuating element penetrates an opening in the transmission lever.

In a further embodiment it is provided that the spring device is supported at the transmission lever by way of a swivel element. The vehicle part carrying out the relative movement in respect of the braking pressure control unit may thus advantageously move transversely in respect of the longitudinal axis of the actuating device, too.

Further, it is provided that the end of the second actuating element, which penetrates the transmission lever, has a stop means, preferably in the form of a threaded section and a nut, and in that between the stop means and the transmission lever or rather the swivel element a spacer may be inserted for blocking the length of the prestressed spring device.

A favorable manufacture in terms of cost as well as a facilitation of assembly are achieved by an embodiment where the swivel element is designed as a moulded sheet-metal part having two pivots formed fast therewith the cross-sections of which have the shape of circular segments and by means of which the swivel element may be inserted into unilaterally open bearing points at the transmission lever designed as a moulded sheet-metal part, the bearing points having openings for the insertion and the width of said openings corresponding to the height of the circular segment and, apart from the clearance of motion, the diameters of areas of the bearing points corresponding to the diameters of the pivots which diameters exceed the width of the openings.

It further may be provided that the spring device is designed as a tension spring forming part of the first actuating element, that the rod-like end of the first actuating element penetrates an opening in the transmission lever and is displaceable and may be fastened with the end, penetrating the opening, in the hollow bore of the second actuating element, and that the spring designed as a tension spring is fastened at confronting sections of the first and second actuating elements. Preferably, the spring has a maximum force which is smaller than the force of the spring device when blocked.

BRIEF DESCRIPTION OF THE DRAWING

Embodiments of this invention when taken in conjunction with the drawing wherein.

DETAILED DESCRIPTION

Figure 1:
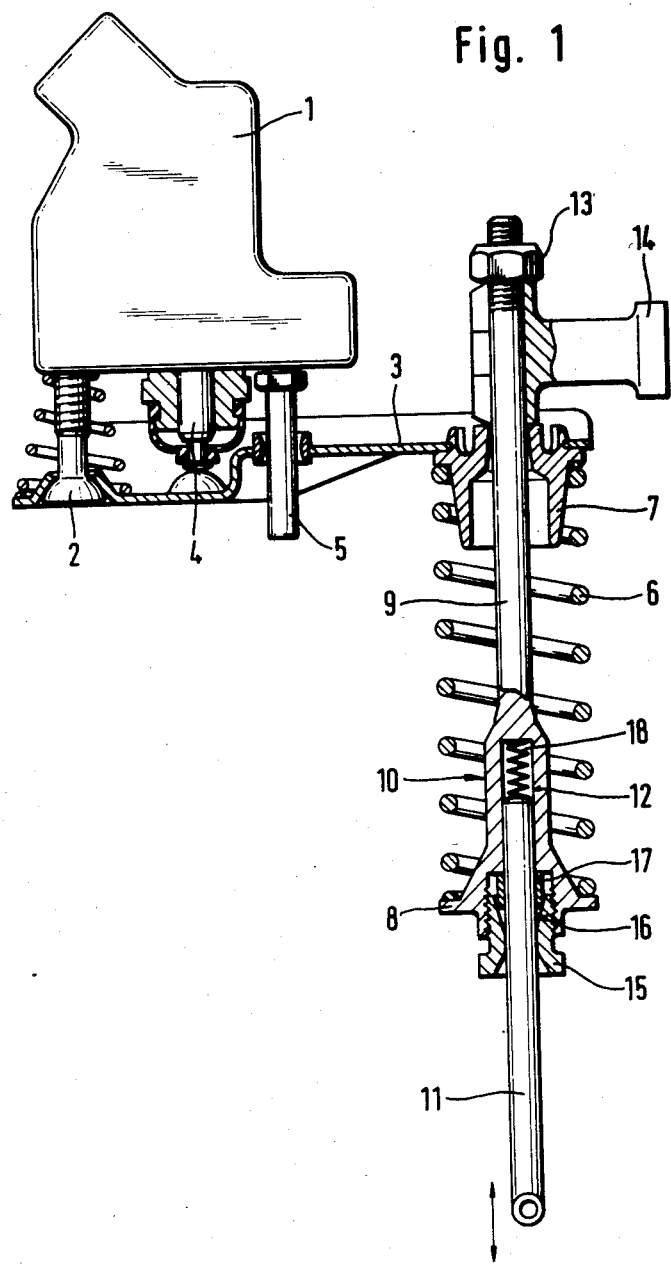
FIG. 1 shows an inventive braking pressure control unit.

The illustrated braking pressure control unit which is actuatable in a load-responsive manner essentially consists of a housing 1, of a transmission lever 3 rotatably supported with one end of a ball pin 2, of two valves arranged in bores of the housing 1, only the end of the control piston 4 of one of the valves, which protrudes from the housing 1, being illustrated in an offset partial section, as well as of an actuating device 10, and of a spring device 6 for the generation of the control force.

Each valve is associated with a pressure medium inlet communicating with a braking pressure source as well as with a pressure medium outlet leading to at least one rear wheel brake cylinder.

The ends of the two control pistons 4 rest at partially spherical areas of the transmission lever 3. When a pressure is built up and a certain braking pressure is reached, starting from a defined open position of the valves in which the valves are supported at parts of the housing and in which the valve closure members are lifted off from the valve seats, the control pistons 4 are moved axially out of the housing 1 under the action of the pressure medium against a control force and are moved into their closing positions for the first time. This first closing operation takes place at the so-called change-over pressure which defines the change-over point. The control force is generated by the spring device 6 and is transmitted to the control piston ends by way of the transmission lever 3. If in a braking pressure control unit, for example, designed as a pressure reducer there is a pressure increase at the pressure medium inlet after the first closing operation the resulting pressure increase at the pressure medium outlet will be reduced in accordance with ratio of the pressure-applicable effective surfaces of the control piston 4.

The plane of the swivelling motion of the transmission lever 3 around the ball pin 2 is defined by means of a guide pin 5. In addition to the swivelling motion, the transmission lever 3 may also carry out a tilting movement around the ball pin 2, said tilting movement ensuring the even distribution of the control force to the ends of the control pistons 4.

In FIG. 1, the end of the transmission lever 3 which is not associated with the ball pin 2 has a spring hinge element 7 provided with an opening and serving for the support of the spring device 6 designed as a compression spring. In order to enable the tilting movement of the transmission lever 3 the opening in the spring hinge element 7 is cone-shaped. This also ensures a relative movement between the hinge point for the actuating device (first actuating element 11) and the housing 1 of the braking pressure control unit. The other end of the spring device 6 is supported at a collar of a component (second actuating element 9) of the actuating device 10 for the load-responsive change of the force of the spring.

The actuating device 10 essentially consists of a first actuating element 11 and of a second actuating element 9 between which a spring 18 is arranged. The first actuating element 11 is designed like a rod. It may be fastened with one of its ends at a part of the vehicle which is movable in a load-responsive manner relative to the housing of the braking pressure control unit, for example, at a non-illustrated part connected with the real axle. The other end displaceably projects into a hollow bore 12 in the second actuating element 9. The spring device 6 is supporting itself at said second actuating element 9. The end of the actuating element 9 which is not provided with the hollow bore 12 penetrates openings in the spring hinge element 7 and in the transmission lever 3 and is provided with a threaded section onto which a nut 13 is screwed. Between the nut 13 and the spring hinge element 7 a removable spacer 14 is provided which blocks a stress relief of the prestressed spring unit 6. To this end, the spacer 14 has a U-shaped recess by means of which it can be placed onto the second actuating element 9 transversely to the axis of the rod-like end of the second actuating element 9. The spring device's 6 prestress fixed by the position of the nut 13 and of the spacer 14 is adjusted such as to ensure that a predetermined change-over pressure of the braking pressure control unit is maintained.

The spring 18 is arranged in the hollow bore 12 of the second control element. On the one hand, said spring 18 supports itself at the first actuating element 11 and, on the other hand, at the second actuating element 9 and presses these two elements apart.

At its outer end, the hollow bore 12 has an expanded section having an internal thread into which section a screwed insert 15 may be screwed, which has an opening for the first actuating element 11 as well as a cone-shaped expansion 16 at the end facing the hollow bore 12. Resting at the cone-shaped expansion 16 is an end of a preferably slotted ring 17 the other end of which rests at the shoulder at the transition from the expanded section towards the narrow section of the hollow bore 12. By screwing the screwed insert 15 in, by way of the cone, the ring 17 is pressed radially inwards against the rod-like end area of the first actuating element 11, thus the two parts being connected so as to form a structural unit of defined length.

The braking pressure control unit is mounted at the vehicle in the preassembled condition illustrated in FIG. 1. After the housing 1 and the first actuating element 11 have been fastened at the associated vehicle parts, by means of the spring 18 arranged in the hollow bore 12, the transmission lever 3 is pressed by way of the second actuating unit 9 into the position in which the valves are in a defined open position. By the subsequent screwing-in of the screwed insert 15 the thus adjusted position of the two actuating elements 9 and 11 is fixed so that these two actuating elements 9 and 11 form a structural unit of defined length, connecting the pistons 4 in a manner free from play by way of the transmission lever 3 with the vehicle part whereat the actuating element 11 is fastened. After the removal of the spacer 14 the braking pressure control unit is ready for operation.

Figure 2:
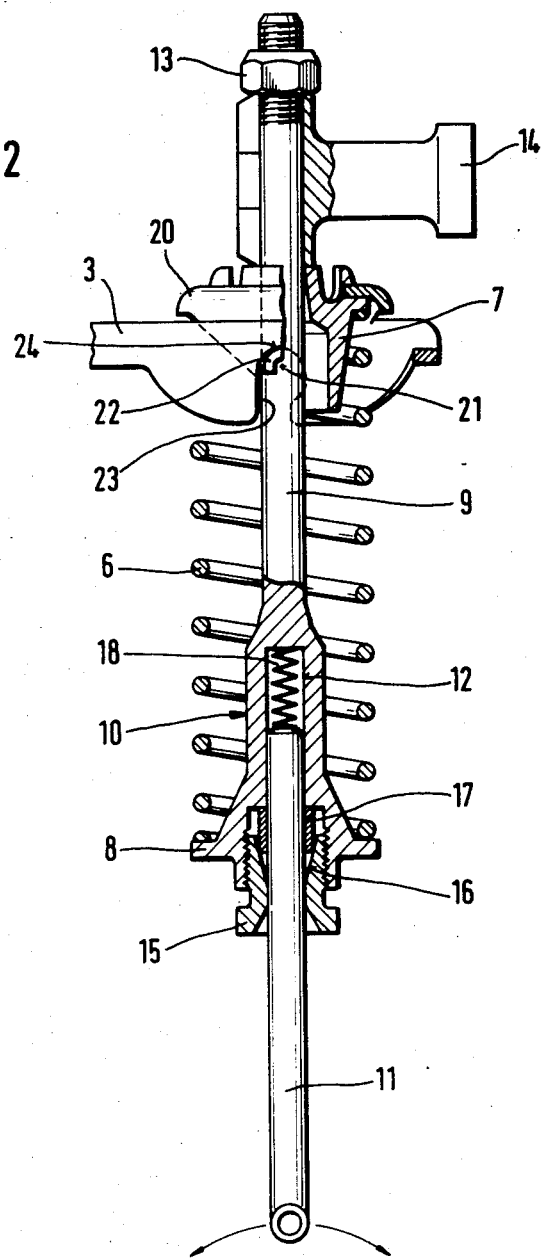
FIG. 2 shows a partial sectional representation of a part of an actuating device; and, FIG. 3 shows a further braking pressure control unit according to the present invention.

Referring to the part of an inventive actuating device 10 illustrated in FIG. 2, in contrast to the braking pressure control unit according to FIG. 1, the spring hinge element 7 is not directly fastened to the transmission lever 3 but rather is fastened with a swivel element 20 being interposed which is movable around a swivelling axis 21. The swivel element 20 is designed as a moulded sheet-metal part and has two pivots 22 formed fast therewith. The cross-sections of said pivots 22 essentially have the shape of circular segments. By way of openings 23, the swivel element 20 may be inserted with its pivots 22 into unilaterally open bearing points 24 provided at the transmission lever 3 likewise designed as a moulded sheet-metal part. The openings 23 have a width which approximately corresponds to the height of the circular segment profile of the pivots 22 whereas the bearing points 24 have areas with a diameter which exceeds the diameter of the pivots 22 by the clearance of motion. In operation, the swivel element adopts positions differing from the position in which it was introduced into the bearing points 24, thus any unintentional moving of the pivots 22 out of the bearing points 24 being safely prevented.

Due to the clearance of motion between the swivel element 20 and the transmission lever 3 it is particularly advantageous that, when adjusting the actuating device 10, the transmission lever 3 is pressed by the spring 18, with the play being eliminated, into the position associated with the defined open position of the valves. Because of the arrangement of the swivel element 20 the vehicle part whereat the first actuating element 11 is fastened may not only carry out movements running in the axial direction of the actuating device 10 but rather may also simultaneously move transversely in respect thereof as indicated by the arrows in FIG. 2.

In the braking pressure control unit illustrated in FIG. 3 both the spring device 6' and the spring 18' are designed as tension springs. The first actuating element 11' has a first hook-shaped end 30 by means of which it may be hung at a vehicle part which moves relative to the housing 1 of the braking pressure control unit. The other end 32 penetrates an opening in the transmission lever 3 and is enclosed by the second actuating element 9' bored through. The second actuating element 9' has a screwed insert 15' and a ring 17' for the mutual fixation of the actuating units 9' and 11', the mode of operation of the screwed insert 15' and of the ring 17' already having been explained.

The spring device 6' is manufactured or rather may be manufactured in one piece with the first actuating element 11'.

The spring 18' designed as a tension spring is arranged between the actuating elements 9' and 11'. Due to the fact that, by means of end windings, the spring 18' engages annular grooves at the actuating elements 9' and 11', the spring 18' is fastened at these parts.

The spring element 6' being blocked and the first actuating element 11' being hung, the transmission lever 3 is drawn by the force of the spring 18' into the position associated with the defined open position of the valves. Thus a backlash-free adjustment of the actuating unit 10' is ensured. The blocking of the stress relief movement of the prestressed tension spring (spring device 6') is effected by the spacer 14' inserted between the shoulders 33, 34 of the spring device 6'. After the actuating device 10' has been mounted without play and after the mutual fixation of the actuating elements 9' and 11' the spacer 14' is removed and the braking pressure control unit is ready for operation.

What is claimed is:

1. A braking pressure control unit for a brake system for a vehicle comprising, in combination:
   a housing having at least one control piston valve mounted therein;
   a transmission lever mounted in and extending away from said housing, one end of said transmission lever engaging said piston valve;
   a spring hinge element connected to the other end of said transmission lever;
   first and second actuating rods, said second actuating rod having a first end extending through said spring hinge element and having a second end provided with a bore for receiving a first end of said first actuating rod;
   means for connecting the second end of said first actuating rod to a part of the vehicle which is movable relative to said housing in response to vehicle loading;
   a first spring coaxially surrounding said first and second actuating rods and mounted between said spring hinge and radial projection of said second actuating rod; and,
   a second spring in said bore for resiliently urging said first and second actuating rods away from one another.

2. The braking pressure control unit according to claim 1 wherein said spring hinge is connected to said transmission lever with a swivel element whereby said transmission lever can pivot about said spring hinge.

* * * * *